(No Model.)
C. P. STIRN.
PHOTOGRAPHIC CAMERA.
No. 418,343. Patented Dec. 31, 1889.
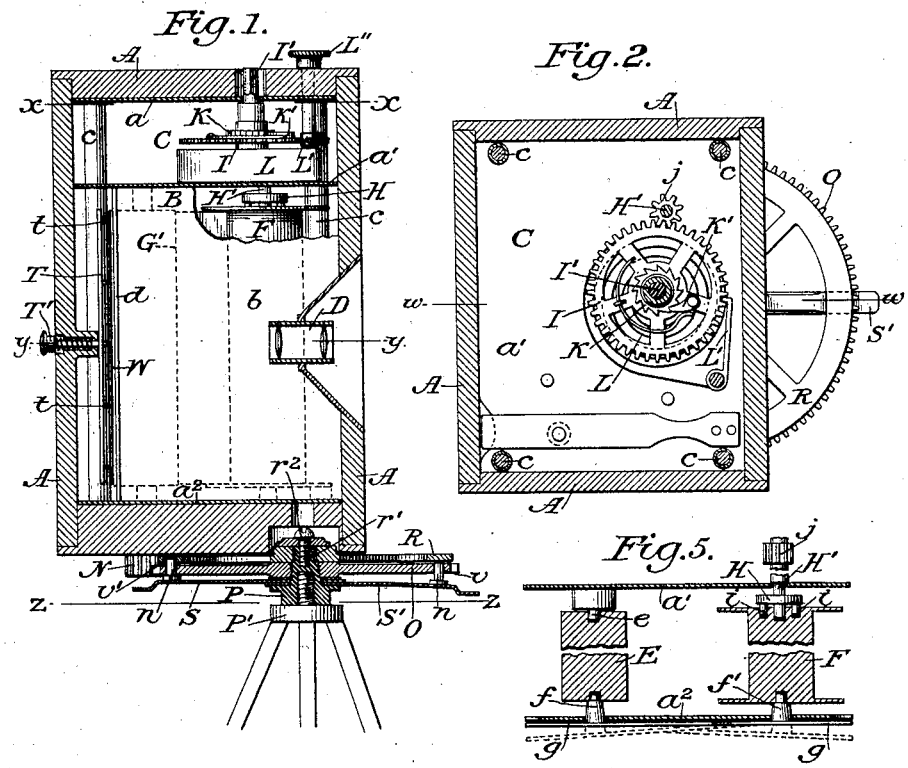
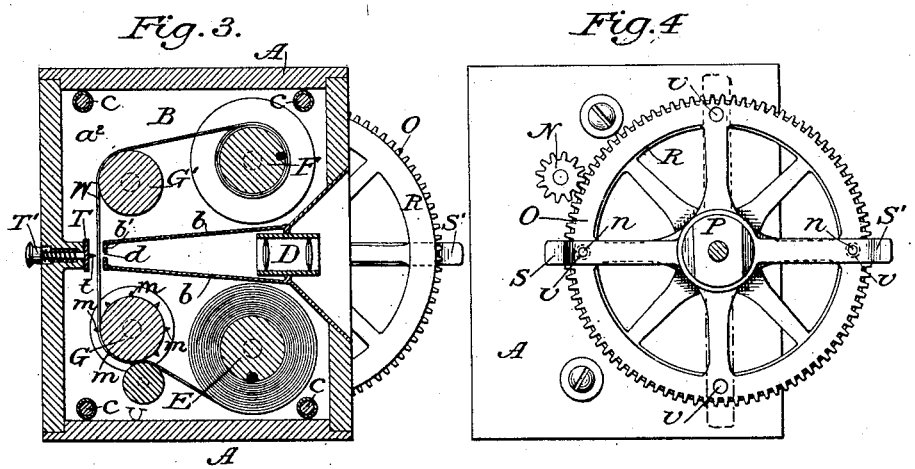
Attest:
A. N. Jesbera
E. W. Watson
Inventor:
Carl P. Stirn
By David A. Burr
Atty.

UNITED STATES PATENT OFFICE.

CARL P. STIRN, OF NEW YORK, N. Y.

PHOTOGRAPHIC CAMERA.

SPECIFICATION forming part of Letters Patent No. 418,343, dated December 31, 1889.

Application filed April 15, 1889. Serial No. 307,368. (No model.)

*To all whom it may concern:*

Be it known that I, CARL P. STIRN, of the city, county, and State of New York, have invented certain new and useful Improvements in Revolving Photographic Cameras; and I do hereby declare that the following is a full and exact description thereof, reference being had to the accompanying drawings, and to the letters of reference marked thereon, making a part of this specification.

My invention relates to that class of photographic instruments in which the camera is made to revolve during exposure, so as to obtain a panoramic view of the entire scene encircling the camera or of any desired portion thereof.

It consists in improved devices for moving the camera and in a novel construction and arrangements of its parts, as hereinafter described and claimed, and has for its object to simplify the apparatus and render it more compact and efficient.

In the accompanying drawings, Figure 1 is a vertical central section of my improved photographic camera; Fig. 2, a horizontal section in line $xx$ of Fig. 1; Fig. 3, a similar section in line $yy$; Fig. 4, a similar section in line $zz$, but looking upward, so as to obtain a bottom view of the instrument and its lower gear; Fig. 5, a detached sectional view of the upper and lower ends of the supply-spool and winding-reel.

Similar letters indicate like parts in all of the figures.

My improved camera is constructed of a suitable case A A, embracing an exposing-chamber B of a depth somewhat greater than the focal distance of the lens to be used and of a height exceeding somewhat the diameter of its field, and having a space C above said chamber to contain the spring-actuated mechanism by which the revolution of the camera is produced. Within the case A A is fitted a frame carrying the film supporting and guiding rollers and the motive mechanism. This frame consists of an upper and lower plate $a a^2$ and an intermediate parallel plate $a'$, which separates the exposing-chamber from the compartment to contain the motor, the three plates being supported and confined in the customary manner by rods $c\ c\ c\ c$ at the four corners thereof.

The lens D is centrally mounted in the front of the camera, at the outer end of a narrow compartment formed by two vertical partitions $b\ b$, fitted one on each side of the lens, and which extend from the front plate of the camera nearly to the rear end of the exposing-chamber and from top to bottom thereof, said compartment being closed by a vertical rear plate $b'$, in which is pierced a narrow longitudinal slit $d$ in alignment with the center of the lens. Within the spaces left on each side of this lens-compartment are fitted the supply spool or roller E, on which is wound a sensitized flexible photographic film W in readiness for exposure, and the reel or roller F, upon which the film is wound up after exposure, and on each side of the rear end of the lens-compartment are mounted guide-rollers G and G', over which the film is led from the film-spool E to the reel F, these guide-rollers being so located as to carry the film in a vertical plane in close proximity to the outer face of the slitted plate $b'$, closing the rear end of the lens-compartment. The guide-rollers are fixed to rotate each upon end spindles having bearings in the top and bottom plates $a$ and $a^2$ of the exposing-chamber.

The spool E and reel F are severally mounted in manner to permit of their ready detachment and removal or replacement in the camera. The supply-spool E is provided with a central socket at each end, and a stud-pin $e$ is fixed to project from the inner side of the top plate $a'$ to engage the socket in the upper end of the spool, while its lower end is normally engaged by a pin $f$, projecting upward through the bottom plate $a^2$ from a flat spring-plate $f'$, whose free end extends out beyond the edge of the bottom plate to permit of being depressed, so as to release the pin from the spool. Although I prefer to cause the lower pin to be pressed inward to engage the end of the spool by means of a flat spring-plate $g$, serving as a lever for its withdrawal, as described, it is evident that the pin may be actuated by other well-known devices which will permit of its ready withdrawal to release the spool. The film-winding reel or roller F is in like manner confined in its place and left free to rotate by means of a spring-actuated pivot-pin $f'$ engaging its lower end, but which admits of being readily withdrawn to set free the roller, and its upper end is provided with one or more holes at one side of its axis to engage a counterpart pin $i$ or pins $i$ $i$, projecting from a head H, secured to a rotating spindle H', projecting into the exposing-chamber. This reel-spindle H' is mounted in suitable bearings in the upper plate $a$ and partition-plate $a'$, and is fitted at its outer end with a pinion $j$, meshing with a toothed wheel I, turning loosely upon a winding-spindle I', but geared thereto by means of a spring-actuated pawl K', carried thereby, to engage a ratchet-wheel K, fixed on the spindle. This ratchet-wheel K is attached to one end of a coiled spring L, whose opposite end is fixed to the frame, so that by turning the spindle I' by means of a key the spring will be wound up, and when left free will operate to cause a revolution of the ratchet-wheel K, and with it the toothed wheel I, and thereby drive the reel-spindle H'. The movement of the wheel I is prevented when desired, after the spring is wound up, by means of a stop consisting of a dog L', pivoted to swing into engagement with the teeth of said wheel to lock it, and which is operated from above by means of a knob L'' on the outer end of its axial shaft.

A series of sharp-pointed pins $m$ $m$ are fitted to project radially from the periphery of one of the guide-rollers G, near each end thereof, to engage the two edges of the sensitized film or roll W passed over it from the spool to the reel, and the lower axial spindle of said roller is extended through the bottom plate $a^2$ of the frame and is fitted with a pinion N to engage a toothed wheel O, screwed upon or otherwise fixed to a central head P, adapted to be secured in any suitable manner to the top of the stand or tripod P' for the camera. A circular plate R, of a diameter corresponding with that of the wheel O, is made fast to the bottom of the camera, with its center in exact alignment with the optical center or transverse axis of the lens, and the center of this plate R is fitted upon a pivot-pin $r'$, projecting centrally from the head P, so as to revolve freely thereon in contact with the upper face of the rim of the fixed wheel O, which thus serves as an annular bearing therefor. The plate R is confined upon the wheel O by means of a screw $r''$, screwing into the upper end of the pivot-pin $r'$, and by an underlying washer of a diameter large enough to overlap the central portion or hub of the plate, as shown in Fig. 1.

Two elastic radial arms S S' are pivoted upon the head P to revolve freely thereon. The outer end of each is fitted with a pin $n$, to bear upwardly with a pressure due to the elasticity of the arm against the rim of the fixed wheel O. Four holes $v$ $v$ $v$ $v$ are pierced through said rim at equal distances apart in position to receive the pin $n$ when it is swung into register therewith, and the pin $n$ is of such length as that when it drops into either of said holes it will bear against the overlying rim of the annular plate R, as shown in Fig. 1, and will drop into engagement with a single hole $v'$, pierced in said rim, when brought opposite thereto, and thereby serve to lock said plate R, and consequently prevent a revolution of the camera. By having two of these arms S and S', if, when the camera is locked by one of them, the pin on the second arm is allowed to drop through either of the remaining holes in the wheel, and thereby bear against the rim of the annular plate R, said second pin will operate to arrest the revolution of the camera so soon as said pin reaches the stop-hole $v'$ in the annular plate, and this will occur at the first, second, or third quarter of its revolution, according as the pin was placed in the first, second, or third hole from that engaged by the first arm. The arms are made to project far enough beyond the rim of the wheel to permit them to be readily depressed when required for disengagement or adjustment.

A perforating-bar T is fitted vertically immediately within the rear plate of the camera and in line with the slit $d$ in the lens-compartment upon a spring-actuated push-pin T', projecting through said rear plate. The inner face of said bar T' is provided with a series of sharp pins $t$ $t$, of such length as that when the bar is pushed inwardly against the stress of the spring encircling the push-pin the points will pierce the film C stretched over the slot. By means thereof, so soon as an exposure has been made, the division of the picture from that next to follow it may be marked upon the film by punctures therein.

An auxiliary guide-roller U is mounted detachably in proximity to the driving-roller G, between it and the film-spool, to insure the perforation of the film by the driving-pins $m$ $m$ on said roller G.

In the use and operation of this improved panoramic camera a spool E, carrying a sensitized photographic film C wound up thereon, is inserted in the camera, and the end of the film is carried around the first guide-roller G, so as to be engaged by the pins $m$ $m$ projecting therefrom, thence over in front of and in close proximity to the slit $d$ in the rear plate of the lens-chamber, and then around the second guide-roller G' to the reel or winding-roller F, to which it is made fast in the customary manner. The spring L is then wound up and is locked by the engagement of the dog L' with the toothed wheel I. The pins $n$ $n$ on the arms S S' may then be both made to rest on the rim of the fixed wheel O, so as to permit of a revolution of the camera upon its stand until it is brought to the desired initial point of view, whereupon one of the pins is allowed to drop through one of the apertures $v$ in said wheel into engagement with the underlying aperture $v'$ in the annular bearing-plate R, carrying the camera, so as to lock it. If now the spring L be set free, it will exert its tension by means of the intervening gear, as described, upon the windup roller or reel F to cause it to revolve in the proper direction to exert a tension upon the film C, and, as the film is engaged by the teeth m m upon the roller G, this tension will be exerted upon said roller to cause it to revolve, and, by means of the engagement of its pinion N with the teeth of the fixed wheel O, to cause the pinion, and with it the camera, to revolve about said wheel. So long as the camera remains locked by the engagement of the pin n on the arm S with the annular plate R, as described, the tension of the spring will be resisted by said lock and will operate simply to keep the film tightly stretched. So soon, however, as the locking-pin n is disengaged the tension of the spring will operate to wind up the film on the roller F, and by producing thereby a rotation of the roller G will cause the camera to revolve upon its axis, said axis being coincident with the focal axis of the lens. As the locking-pin n, when disengaged from the hole v' in the bearing-plate R, is left free to bear upon and slide over the face of said plate, it will re-enter the hole and arrest the camera so soon as the one complete turn is effected, the pin n' on the second arm S' having been in the meanwhile left to rest upon the rim of the fixed wheel O, so as to be inoperative. If it be desired to take a view involving only a quarter, half, or three-quarter turn of the camera, the second pin n' is adjusted to drop through the first, second, or third hole v of the fixed wheel O, as described, before releasing the camera, so that this second pin, by reaching the stop-hole v' in the overlying plate R in advance of the pin n, will arrest the movement at the quarter, half, or three-quarter turn, as the case may be. After the movement of the camera is arrested and the proper exposure consequently made for one view, the perforating-bar T is pushed to pierce the film and thereby mark the lit of the picture thereon in anticipation of its development.

I claim as my invention—

1. The combination, with a photographic camera revolving upon a pivotal axis and motive mechanism actuating the same to produce its revolution, of an automatic stop to arrest its movement at each complete revolution thereof, substantially in the manner and for the purpose herein set forth.

2. The combination, with a photographic camera revolving upon a pivotal axis and motive mechanism actuating the same to produce its revolution, of an automatic stop to arrest its movement at each complete revolution and an auxiliary adjustable stop to arrest it when it has made a partial revolution after being released from the first stop, substantially in the manner and for the purpose herein set forth.

3. The combination, with a photographic camera revolving upon a pivotal axis and motive mechanism actuating the same to produce its revolution, of the film-supply spool and the film-winding reel mounted within said camera, an intermediate guide-roller geared to revolve in unison with the instrument and over which the film is carried in passing from the spool to the reel for exposure, and pins on said roller made to engage the film to prevent its independent movement over the same, whereby the film is moved in synchronism with the movement of the camera, substantially in the manner and for the purpose herein set forth.

4. The combination, with a photographic camera revolving upon a pivotal axis and with a film-supply spool and a film-winding reel mounted therein, an intermediate guide-roller over which the film is carried and by which it is engaged, and a wheel fixed upon the pivotal axis of the camera and geared to said guide-roller, of a motor geared to the film-winding reel to turn it, whereby the movement of the film automatically produced by the motor will cause a simultaneous revolution of the camera, substantially in the manner and for the purpose herein set forth.

5. The combination of the winding-spindle, the coiled spring attached thereto at one end and to a fixed support at the other, a ratchet fixed upon said spindle, a toothed wheel revolving loosely thereon, a pawl carried by said wheel and engaging said ratchet, a stop to lock the wheel, the reel-spindle mounted parallel with the winding-spindle, the pinion upon said reel-spindle gearing with the toothed wheel on the winding-spindle, the head carried by said reel-spindle, the detachable film-winding reel adapted at one end to be coupled to said head in alignment with its spindle, and the longitudinally-adjustable pivot-pin engaging the opposite end of the reel to serve as a prolongation of its axis, all substantially in the manner and for the purpose herein set forth.

6. The combination, with the head of a camera stand or tripod and with a toothed wheel fixed thereon, of a plate mounted to revolve upon the axis of said fixed wheel, a camera mounted upon said plate with the optical center or transverse axis of the lens directly in line with the pivotal axis of the plate, a film-carrying roller mounted in the camera, having devices for engaging the film led over it, a pinion fixed to the shaft of said roller to gear with the fixed wheel on the stand, a film-supply spool on one side of said roller, and a film-winding reel on the other side thereof, whereby as the film is moved by the action of the winding-reel the camera will be simultaneously revolved upon its axis, substantially in the manner and for the purpose herein set forth.

7. The combination, with the head of a camera stand or tripod, the toothed wheel fixed thereon, the revolving plate pivoted to turn upon the axis of said wheel in proximity thereto, the camera secured upon said plate, a pinion mounted upon the camera and meshing with said toothed wheel, and a motor carried by said camera and geared mediately to said pinion, of the elastic radial arms pivoted to turn independently upon the axis of the toothed wheel beneath the same and the pins projecting from said arms to pass severally through either of a series of holes in the rim of said toothed wheel and into engagement with a single hole in the face of the overlying revolving plate, substantially in the manner and for the purpose herein set forth.

8. The combination, in a photographic camera, with the exposing-slit and the film-guiding rollers by which a sensitized film is held tense over said slit, of a perforating-bar mounted to reciprocate transversely to and from the line of movement of the film and having perforating-points projecting therefrom to penetrate the film when the bar is pressed toward it, substantially in the manner and for the purpose herein set forth.

In testimony whereof I have signed my name to this specification in the presence of two subscribing witnesses.

CARL P. STIRN.

Witnesses:
A. N. JESBERA,
E. M. WATSON.